United States Patent
Naruse et al.

(10) Patent No.: US 8,929,833 B2
(45) Date of Patent: Jan. 6, 2015

(54) WIRELESS COMMUNICATION DEVICE USING A LOOPBACK PATH FOR FAULT DIAGNOSIS

(71) Applicants: Masprodenkoh Kabushikikaisha, Nisshin-Shi, Aichi (JP); Denso Corporation, Kariya-Shi, Aichi (JP)

(72) Inventors: Hirotaka Naruse, Nisshin (JP); Masahiro Kuwabara, Obu (JP); Minoru Okada, Nagoya (JP)

(73) Assignees: Masprodenkoh Kabushikikaisha, Nisshin-Shi, Aichi (JP); Denso Corporation, Kariya-Shi, Aichi (JP)

( * ) Notice: Subject to any disclaimer, the term of this patent is extended or adjusted under 35 U.S.C. 154(b) by 273 days.

(21) Appl. No.: 13/645,504

(22) Filed: Oct. 4, 2012

(65) Prior Publication Data

US 2013/0090068 A1    Apr. 11, 2013

(30) Foreign Application Priority Data

Oct. 7, 2011 (JP) ................................ 2011-223020

(51) Int. Cl.
*H04B 17/00* (2006.01)
*H04W 24/06* (2009.01)

(52) U.S. Cl.
CPC .................................. *H04W 24/06* (2013.01)
USPC ........................................ 455/67.11; 455/423

(58) Field of Classification Search
None
See application file for complete search history.

(56) References Cited

U.S. PATENT DOCUMENTS

| | | | | |
|---|---|---|---|---|
| 5,995,811 | A * | 11/1999 | Watanabe | 455/115.1 |
| 6,154,448 | A * | 11/2000 | Petersen et al. | 370/248 |
| 6,253,060 | B1 * | 6/2001 | Komara et al. | 455/9 |
| 6,269,082 | B1 * | 7/2001 | Mawhinney et al. | 370/247 |
| 2006/0264178 | A1 * | 11/2006 | Noble et al. | 455/67.11 |
| 2012/0207030 | A1 * | 8/2012 | Luong | 370/245 |

FOREIGN PATENT DOCUMENTS

| | | |
|---|---|---|
| JP | 5145499 A | 6/1993 |
| JP | 2005182631 A | 7/2005 |
| JP | 2005354327 A | 12/2005 |

* cited by examiner

*Primary Examiner* — Nay A Maung
*Assistant Examiner* — Alejandro Rivero
(74) *Attorney, Agent, or Firm* — Jenkins, Wilson, Taylor & Hunt, P.A.

(57) ABSTRACT

A disclosed wireless communication device includes an antenna for communication, a transmission unit, a reception unit, a transmission/reception switchover unit, a communication control unit, a diagnosis start determination unit, a loopback path forming unit, a reception level determination unit, a reception duration determination unit, and a fault assertion unit. When a loopback path, which inputs a transmission signal outputted from the transmission unit into the reception unit, is formed by the loopback path forming unit, the reception level determination unit detects a signal level of a reception signal received by the reception unit, and determines whether or not the signal level is normal. The reception duration determination unit measures a reception duration of the reception signal in the reception unit, and determines whether or not the reception duration has exceeded a threshold value for abnormality determination.

10 Claims, 4 Drawing Sheets

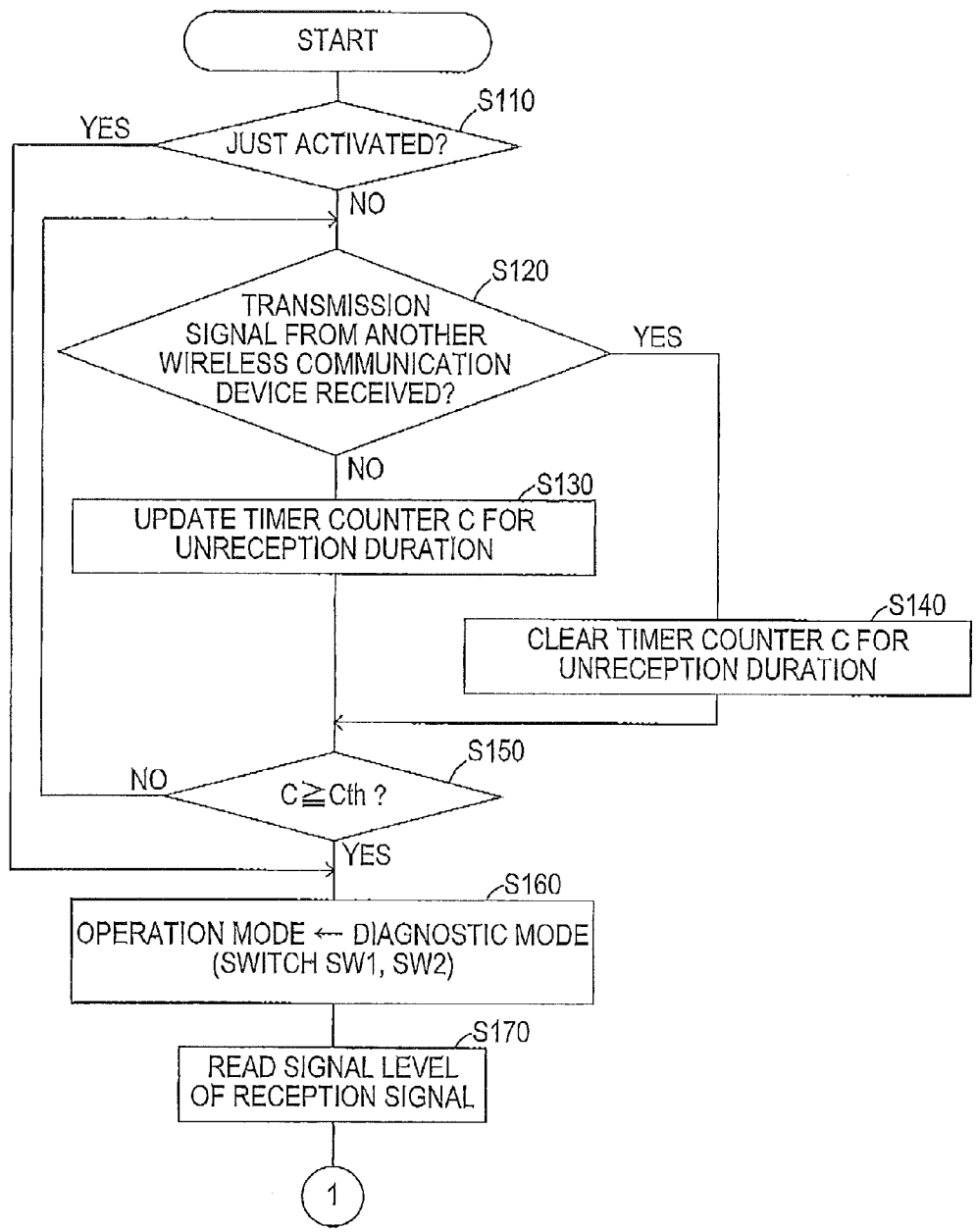

WIRELESS COMMUNICATION DEVICE USING A LOOPBACK PATH FOR FAULT DIAGNOSIS

CROSS-REFERENCE TO RELATED APPLICATIONS

This application claims the benefit of Japanese Patent Application No. 2011.223020 filed Oct. 7, 2011 in the Japan Patent Office, the disclosure of which is incorporated herein by reference.

BACKGROUND

The present invention relates to a wireless communication device that performs transmission and reception in a time-division manner. Specifically, the present invention relates to a wireless communication device that has a function of self-diagnosing a transmission system and a reception system.

A wireless communication device that performs transmission and reception in a time-division manner generally includes a transmission system circuit that performs modulation, amplification and the like of a transmission signal; a reception system circuit that performs amplification, demodulation and the like of a reception signal; and a transmission/reception switchover switch that switches between a transmission period and a reception period by connecting either of these two types of circuits to an antenna.

In an example of the wireless communication device disclosed in Japanese Unexamined Patent Application Publication No. 5-145499, a loopback path is formed, which is designed to input the transmission signal from the transmission system circuit directly into the reception system circuit, between a transmission signal path leading from the transmission system circuit down to the transmission/reception switchover switch and a reception signal path leading from the transmission/reception switchover switch down to the reception system circuit. The example is configured to perform a fault diagnosis of the transmission system circuit and the reception system circuit by determining whether or not the transmission signal from the transmission system circuit has been successfully received by the reception system circuit.

SUMMARY

As a wireless communication device that performs transmission and reception in a time-division manner, widely known is, for example, the one installed in a mobile body and configured to periodically transmit its own information by switching a transmission/reception, switchover switch to a transmission system circuit side in order to notify another wireless communication device in a vicinity of its own position that changes as the mobile body moves. The wireless communication device is also configured to shift into a reception standby state after the above transmission, by switching the transmission/reception switchover switch to a reception system circuit side in order to receive a transmission signal from another wireless communication device.

In such a wireless communication device, in a case where there exists no other wireless communication device in a vicinity, a transmission signal from another wireless communication device cannot be received for a long period of time. However, such a failure to receive a transmission signal from another wireless communication device could be due to a fault in the wireless communication device itself.

Therefore, in a wireless communication device used in a system in which each of a plurality of wireless communication devices performs a periodic transmission, in a case where the wireless communication device does not receive a transmission signal from another wireless communication device for a long period of time, it is possible to self-diagnose whether that is due to absence of another wireless communication device in a vicinity or due to a fault in the wireless communication device itself by performing a fault diagnosis as described in the above example.

However, in the fault diagnosis in the above example, since it is determined whether or not each of the reception system circuit and the transmission system circuit is operating normally based only on properties (a signal level, a phase, and the like) of the reception signal which the reception system circuit has received from the transmission system circuit, in a case where the wireless communication device itself continues to perform transmission due to a fault in the transmission system circuit and thereby another wireless communication device cannot perform wireless transmission, for example, such a fault cannot be self-diagnosed.

Accordingly, it is preferable that the present invention can provide a wireless communication device that performs transmission and reception in a time-division manner and, when a transmission signal from another wireless communication device is not received for a long time, is capable of self-diagnosing accurately whether or not that is due to a fault in the wireless communication device itself.

A wireless communication device of the present invention includes an antenna for communication, a transmission unit, a reception unit, transmission/reception switchover unit, a communication control unit, a diagnosis start determination unit, a loopback path forming unit, a reception level determination unit, a reception duration determination unit, and a fault assertion unit. The transmission unit outputs a transmission signal to the antenna. The reception unit signal-processes a reception signal from the antenna. The transmission/reception switchover unit selectively connects the antenna to either of the transmission unit and the reception unit. The communication control unit periodically connects the transmission unit to the antenna through the transmission/reception switchover unit to cause a periodic transmission to be performed by the transmission unit, and after the periodic transmission, connects the reception unit to the antenna through the transmission/reception switchover unit to control the reception unit to be in a reception standby state. The diagnosis start determination unit determines whether or not an unreception period, during which the reception unit does not receive a transmission signal from another wireless communication device, has reached a diagnosis start determination period set to be longer than a cycle of the periodic transmission. The loopback path forming unit forms a loopback path, which inputs the transmission signal outputted from the transmission unit into the reception unit, when the diagnosis start determination unit determines that the unreception period has reached the diagnosis start determination period. The reception level determination unit detects a signal level of a reception signal received by the reception unit when the loopback path is formed by the loopback path forming unit, and determines whether or not the signal level is normal. The reception duration determination unit measures a reception duration of the reception signal in the reception unit when the loopback path is formed by the loopback path forming unit, and determines whether or not the reception duration has exceeded a threshold value for abnormality determination. The fault assertion unit determines that the wireless communication device is out of order in either of following cases: where the reception level determination unit determines that the signal level of the reception signal is not normal; and where the reception duration determination unit determines that the reception duration has exceeded the threshold value, and indicates such a fault in the wireless communication device.

Specifically, in a case where the unreception period, during which the reception unit does not receive a transmission signal from another wireless communication device, is prolonged, the wireless communication device itself is likely to be out of order and, therefore, in the wireless communication device of the present invention, when the unreception period has reached the diagnosis start determination period, the loopback path is formed to perform a fault diagnosis.

In such a fault diagnosis, it is determined not only whether or not the reception unit has normally received the reception signal from the signal level of the reception signal received by the reception unit, but also whether or not a period during which the reception unit is receiving the reception signal (the reception duration) has exceeded the threshold value.

As one of abnormal operations of the wireless communication device, the transmission unit could continue to transmit a signal. When such an abnormal operation occurs, another wireless communication device cannot perform transmission due to a transmission radio wave from the wireless communication device. In the present invention, such an abnormal operation is determined to exist by the reception duration determination unit. Thus, according to the present invention, in a case where the unreception period, during which the reception unit does not receive a transmission signal from another wireless communication device, is prolonged, it is possible to self-diagnose accurately whether or not that is due to a fault in the wireless communication device itself. The fault assertion unit determines a fault in the wireless communication device based on a result of determination by the reception level determination unit or the reception duration determination unit, and indicates the fault. Therefore, a user can detect the fault in the wireless communication device rapidly and take predetermined measures such as interruption of a power supply of the wireless communication device.

The diagnosis start determination period may be set to be any period as long as the period is longer than the cycle of the periodic transmission. For example, the diagnosis start determination period may be set to be equal to or longer than twice the cycle of the periodic transmission.

The wireless communication device of the present invention may further include a modulation unit, a demodulation unit, and a restored data determination unit. The modulation unit converts a transmission data into a transmission signal for wireless transmission. The demodulation unit restores a reception data from the reception signal received by the reception unit. The restored data determination unit determines whether or not the transmission data before conversion into the transmission signal by the modulation unit has been restored from the reception signal inputted into the reception unit through the loopback path by the demodulation unit when the loopback path is formed by the loopback path forming unit. In such a case, the fault assertion unit may be configured to also determine that the wireless communication device is out of order when the restored data determination unit determines that the transmission data before conversion into the transmission signal by the modulation unit is not restored.

If the fault assertion unit is thus configured, it is possible to also determine that the wireless communication device is out of order when an abnormality occurs in the modulation unit or the demodulation unit, and to indicate that effect.

The fault assertion unit may be configured to prohibit wireless communication by the wireless communication device when the fault assertion unit determines that the wireless communication device is out of order.

If the fault assertion unit is thus configured, it is possible to suppress that an operation of the faulty wireless communication device adversely affects wireless communication of another wireless communication device.

More specifically, the fault assertion unit may be configured to interrupt a power supply of the wireless communication device when the fault assertion unit determines that the wireless communication device is out of order.

In such a case, the fault assertion unit may be configured to continue to indicate the fault in the wireless communication device even after the fault assertion unit has interrupted the power supply of the wireless communication device.

Alternatively, the fault assertion unit may be configured to interrupt at least a power supply of the transmission unit when the fault assertion unit determines that the wireless communication device is out of order.

In such a case, the fault assertion unit may be configured to continue to indicate the fault in the wireless communication device even after the fault assertion unit has interrupted the at least the power supply of the transmission unit.

The wireless communication device of the present invention may be installed in a mobile body or installed in a fixed station that performs wireless communication with a wireless communication device installed in a mobile body.

BRIEF DESCRIPTION OF THE DRAWINGS

The present invention will be described below by way of example with reference to the accompanying drawings, in which:

FIGS. 2A and 2B are flowcharts showing a fault diagnosis process performed by a control unit of the embodiment.

DETAILED DESCRIPTION OF THE PREFERRED EMBODIMENTS

Figure 1:
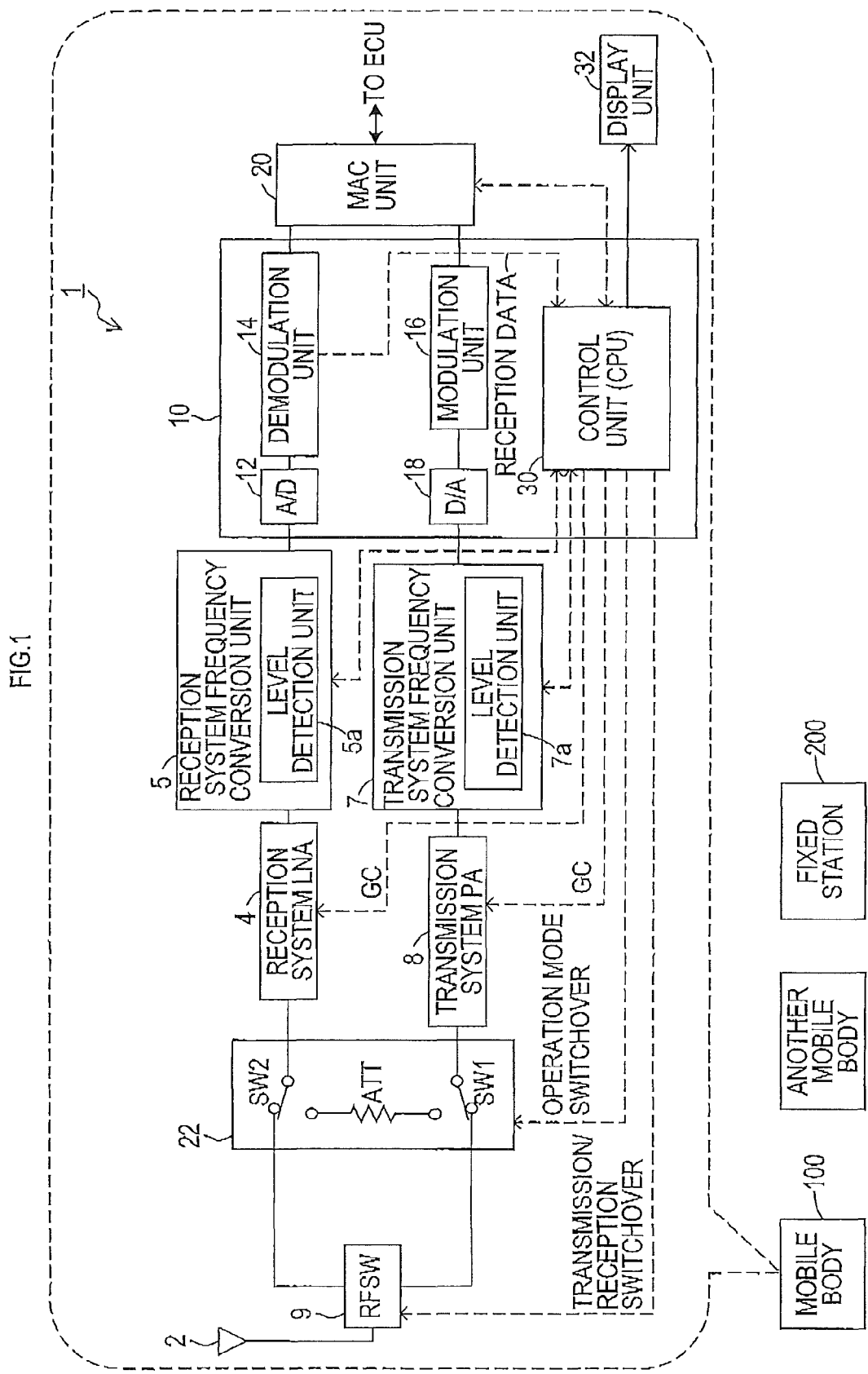
FIG. 1 is a block diagram showing a configuration of a wireless communication device of an embodiment.

A wireless communication device 1 of the present embodiment shown in FIG. 1 is, for example, installed in a mobile body 100 such as an automobile, and performs wireless communication with a wireless communication device installed in another mobile body vehicle-to-vehicle communication) or with a wireless communication device installed in a fixed station 200, which performs wireless communication with wireless communication devices installed in these mobile bodies, such as a roadside machine positioned in a vicinity of a travel path (a road-to-vehicle communication), using a CSMA/CA (Carrier Sense Multiple Access/Collision Avoidance) system. The wireless communication device 1 includes an antenna 2 for communication.

Since transmission/reception is performed using one communication channel in the CSMA/CA system, either of an analog circuit of a reception system and an analog circuit of a transmission system is selectively connected to the antenna 2 through a radio-frequency switch (hereinafter referred to as an "RFSW") 9 for switchover between transmission and reception.

The analog circuit of the reception system includes a low noise amplifier (hereinafter referred to as an "LNA") 4 that amplifies a reception signal from the antenna 2; and a frequency conversion unit 5 that frequency-converts (down-converts) the reception signal amplified in the LNA 4 into a base-band reception signal.

The base-band reception signal frequency-converted in the frequency conversion unit 5 is inputted into a base band processor 10.

The base band processor 10 includes an A-D conversion unit 12 that converts the reception signal into a digital signal; and a demodulation unit 14 that processes the digital signal A-D converted by the A-D conversion unit 12 to restore the reception data.

The reception data restored in the demodulation unit 14 is outputted to a MAC (Media Access Control) unit 20 that performs a predetermined operation relating to a MAC layer. After processed in the MAC unit 20, the reception data is outputted to an ECU (an electronic control unit: for example, a navigation device for driver assistance and the like) installed in the mobile body 100.

A transmission data is inputted from the ECU into the MAC unit 20, and the MAC unit 20 processes the inputted data to output the processed inputted data to the base band processor 10 at such a transmission timing as to be set based on a carrier sense.

In the base band processor 10, there are provided a modulation unit 16 that modulates the inputted data from the MAC unit 20 into a transmission signal (a digital signal) in accordance with a preset modulation system; and a D-A conversion unit 18 that converts the digital signal from the modulation unit 16 into an analog signal.

The transmission signal converted into the analog signal by the D-A conversion unit 18 is outputted to the RFSW 9 through the analog circuit of the transmission system.

The analog circuit of the transmission system includes a frequency conversion unit 7 that frequency-converts (up-converts) a base-band transmission signal outputted from the D-A conversion unit 18 in the base band processor 10 into a high-frequency signal for wireless transmission; and a power amplifier (hereinafter referred to as a "PA") 8 that amplifies the transmission signal frequency-converted by the frequency conversion unit 7.

In the frequency conversion unit 5 of the reception system and the frequency conversion unit 7 of the transmission system, there are respectively provided a level detection unit 5a and a level detection unit 7a that respectively detect a signal level of the reception signal and a signal level of the transmission signal, which are used for gain control and the like of the LNA 4 and the PA 8, respectively.

In both of a reception signal path connecting the LNA 4 of the reception system and the RFSW 9, and a transmission signal path connecting the PA 8 of the transmission system and the RFSW 9, there is provided a path switchover circuit 22.

The path switchover circuit 22 includes a pair of switchover switches SW1 and SW2, which respectively close the transmission signal path between the PA 8 and the RFSW 9, and the reception signal path between the LNA 4 and the RFSW 9 when the wireless communication device 1 is in a normal communication mode, and which interrupt these paths and connect an output of the PA 8 and an input of the LNA 4 to form a loopback path when the wireless communication device 1 is in a diagnostic mode for diagnosing a fault.

In the loopback path formed by the switchover switches SW1 and SW2, an attenuator ATT is provided that attenuates the transmission signal outputted from the PA 8 to a proper level at which the LNA 4 is not saturated.

The base band processor 10 includes the A-D conversion unit 12, the demodulation unit 14, the modulation unit 16, and the A-A conversion unit 18, which are used to digital-process a reception signal or a transmission signal; as well as a control unit 30 including a microcomputer (CPU).

The control unit 30 performs various controls for wireless communication in synchronization with an access control by the MAC unit 20. Such various controls for wireless communication include a switchover between transmission and reception by the RFSW 9, a gain control (GC) of the LISA 4 of the reception system and the PA 8 of the transmission system, controls of the frequency conversion unit 6 of the reception system and the frequency conversion unit 7 of the transmission system, and the like.

The control unit 30 switches the RFSW 9 to a transmission system circuit side periodically, and permits a transmission data to be outputted from the MAC unit 20 to the base band processor 10. The control unit 30 thereby causes information of the wireless communication device 1 to be transmitted periodically to another wireless communication device in a vicinity.

Furthermore, the control unit 30 performs a fault diagnosis process for self-diagnosing whether or not the wireless communication device 1 is out of order in a case where a transmission signal from another wireless communication device is not received for a long period of time during wireless communication.

An explanation will be given below about the fault diagnosis process performed by the control unit 30 with reference to FIGS. 2A and 2B. In performing the fault diagnosis process, a display unit 32 for indicating diagnosis results is connected to the control unit 30.

Figure 2B:
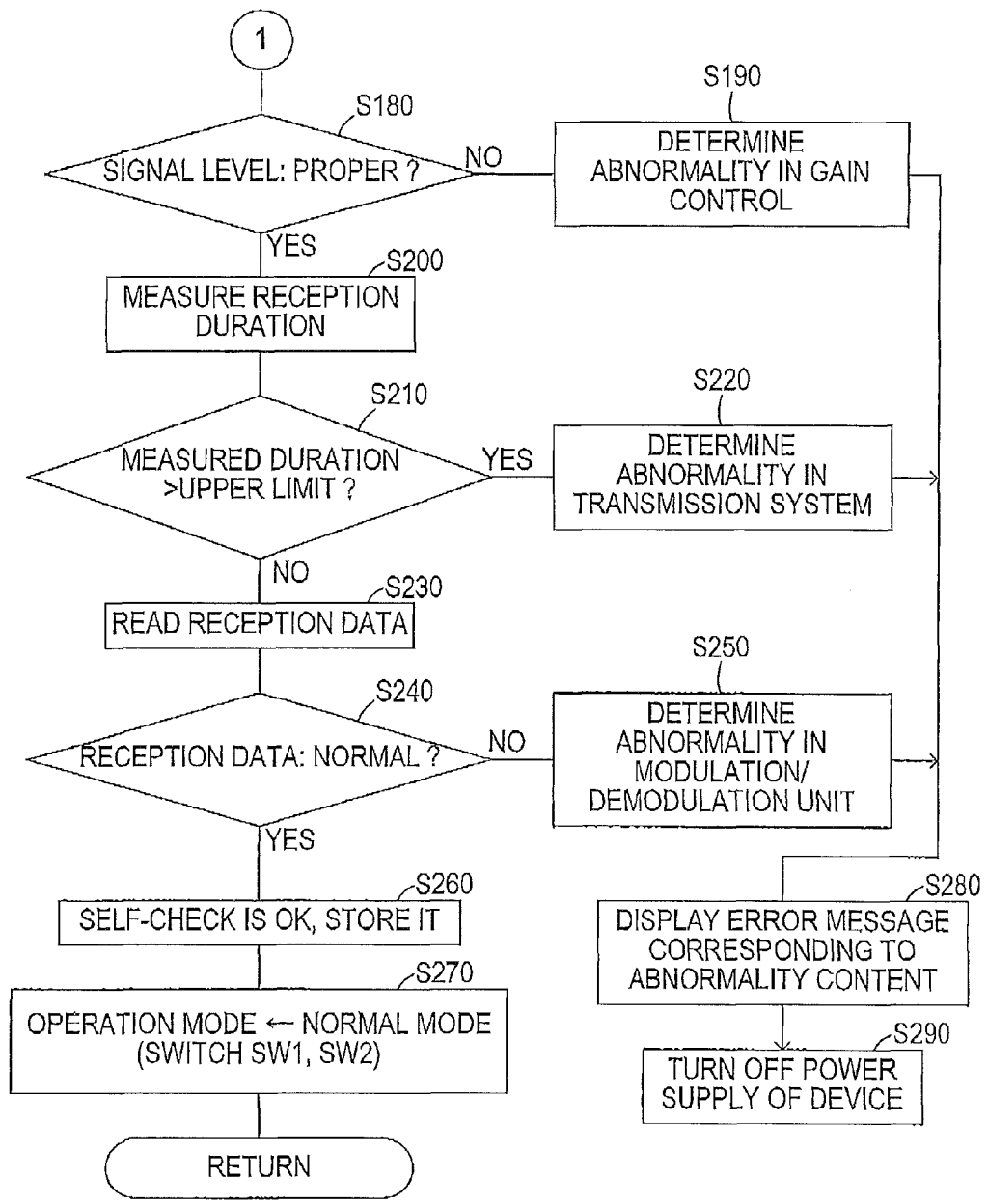

As shown in FIGS. 2A and 2B, when the fault diagnosis process is started, firstly it is determined in S110 (S represents a step) whether or not the wireless communication device 1 has just been activated. If the wireless communication device 1 has just been activated, the process proceeds to S160. In, contrast, if it is not the case in which the wireless communication device 1 has just been activated, the process proceeds to S120.

In S120, it is determined whether or not a transmission signal from another wireless communication device has been received by the antenna 2 (specifically, whether or not a transmission data from the another wireless communication device has been demodulated by the demodulation unit 14).

If it is determined in S120 that the transmission signal from the another wireless communication device has been received, the process proceeds to S140 and a timer counter C for timekeeping an unreception duration is cleared. In contrast, if it is determined in S120 that the transmission signal from the another wireless communication device has not been received, the process proceeds to S130 and the timer counter C is counted up (+1) to update a value of the timer counter C.

After the timer counter C is updated in S130 or cleared in S140 as above, the process proceeds to S150 and it is determined whether or not a value of the timer counter C has reached a predetermined threshold value Cth or more.

The threshold value Cth is set to determine whether or not the unreception period, during which a transmission signal from another wireless communication device is not received, has reached a predetermined diagnosis start determination period based on the value of the timer counter C updated as above. As the threshold value Cth, a value is set which corresponds to a time period (tens of seconds, for example) considerably longer than a cycle of the periodic transmission (0.1 second, for example).

If it is determined in S150 that the value of the timer counter C has not reached the threshold value Cth, the process proceeds to S120 again and the timekeeping of the unreception duration using the timer counter C is continued. In contrast, if it is determined in S150 that the value of the timer counter C has reached the threshold value Cth or more, the process proceeds to S160.

In S160, an operation mode of the wireless communication device 1 is switched from a normal mode to a diagnostic mode by switching the switchover switches SW1 and SW2 to sides to respectively interrupt the transmission signal path and the reception signal path (in other words, to loopback path sides).

Then, in subsequent S170, an input level of the transmission signal inputted from the transmission system circuit into the reception system circuit by the periodic transmission is read through the level detection unit 5a provided in the frequency conversion unit 5 of the reception system, and it is determined in S180 whether or not the signal level is a proper level.

If it is determined in S180 that the signal level read from the level detection unit 5a is not a proper level, it is determined in S190 that an abnormality occurs in the gain control of the PA 8 of the transmission system or of the LNA 4 of the reception system, and the process proceeds to S280, which will be described later. In contrast, if it is determined in S180 that the signal level is a proper level, the process proceeds to S200.

In S200, an input time period (reception duration: in other words, data length of the reception signal) of the transmission signal inputted from the transmission system circuit into the reception system circuit by the periodic transmission is measured, and it is determined in S210 whether or not the measured time period (reception duration) has reached an upper limit time period, which is remarkably longer than a regular periodic transmission time period.

If it is determined in S210 that the reception duration has reached the upper limit time period, the process proceeds to S220. In S220, it is determined that the analog circuit of the transmission system, such as the frequency conversion unit 7 and the PA 8, has an abnormality, and the process proceeds to S280, which will be described later. In contrast, if it is determined in S210 that the reception duration has not reached the upper limit time period, the process proceeds to S230.

In S230, a reception data obtained by demodulating the reception signal is read from the demodulation unit 14. Then, in subsequent S240, it is determined whether or not the read reception data is normal (specifically, whether or not the read reception data is identical to the transmission data periodically transmitted from the transmission system circuit).

If it is determined in S240 that the reception data is not normal, it is determined in S250 that the modulation unit 16 or the demodulation unit 14 in the base band processor 10 has an abnormality, and the process proceeds to S280, which will be described later. In contrast, if it is determined in S240 that the reception data is normal, the process proceeds to S260.

In S260, as a result of the above-described fault diagnosis, it is determined that the wireless communication device 1 has no abnormality (the self-check is OK), and information to that effect is stored in a memory. Then, in subsequent S270, the operation mode of the wireless communication device 1 is returned from the diagnostic mode to the normal mode by switching the switchover switches SW1 and SW2 to sides to respectively close the transmission signal path and the reception signal path, and the process proceeds to S110.

In S280, which is a step performed when an abnormality is determined to exist in S190, S220, or S250, the abnormality (fault) in the wireless communication device 1 is indicated to a driver and the like by displaying on the display unit 32 an error message corresponding to a content of the determined abnormality. Then, the process proceeds to S290 to interrupt a power supply of the wireless communication device 1.

The display unit 32 is disposed in a position that can be visually confirmed by the driver of the mobile body 100, for example, on an instrument panel of the automobile. Once a command to display the error message is received from the control unit 30, the error message is displayed on the display unit 32 continuously even after the power supply of the wireless communication device 1 is interrupted.

As described above, according to the wireless communication device 1 of the present embodiment, the fault diagnosis (specifically, the processings of and after S160) is started by the fault diagnosis process immediately after the wireless communication device 1 is powered on and activated, or when the unreception duration, during which a transmission signal from another wireless communication device is not received, has reached the diagnosis start determination period.

The fault diagnosis is performed as follows. Specifically, the loopback path of the transmission signal from the PA 8 of the transmission system to the LNA 4 of the reception system is firstly formed, and the transmission signal is inputted from the PA 8 into the LNA 4 through the attenuator ATT. Then, a reception level of the transmission signal in the reception system, the reception duration of the transmission signal, and the reception data demodulated in the reception system are sequentially read by the control unit 30. Subsequently, based on each of these parameters read sequentially, the control unit 30 sequentially determines presence/absence of an abnormality in the gain control of the PA 8 or the LNA 4, an abnormality in the analog circuit (the frequency conversion unit 7 and the PA 8) of the transmission system, and an abnormality in the modulation unit 16 or the demodulation unit 14 in the base band processor 10.

If an abnormality is determined to exist in any of these three abnormality determinations performed sequentially as above, an error message indicating a content of the abnormality is displayed on the display unit 32. Furthermore, a communication operation of the wireless communication device 1 is stopped by interrupting the power supply of the wireless communication device 1.

Consequently, according to the wireless communication device 1 of the present embodiment, in a case where the unreception period, during which a transmission signal from another wireless communication device is not received, is prolonged, it is possible to self-diagnose accurately whether or not that is due to a fault in the wireless communication device 1 itself.

In particular, even when a transmission signal is outputted continuously due to a fault in the frequency conversion unit 7 or the PA8 of the transmission system and thereby another wireless communication device cannot acquire a transmission right through a carrier sense, the wireless communication device 1 of the present embodiment can rapidly detect information to that effect.

Moreover, according to the wireless communication device 1 of the present embodiment, when the wireless communication device 1 determines a fault in the wireless communication device 1 itself as above, information to that effect is displayed on the display unit 32 to indicate the fault to a user such as a driver. Thus, the user can thereby detect the fault in the wireless communication device 1 rapidly and take predetermined measures such as interruption of the power supply of the wireless communication device 1.

Furthermore, according to the wireless communication device 1 of the present embodiment, since the wireless communication device 1 interrupts the power supply thereof to stop an operation thereof after indicating the fault therein itself, it can be suppressed that the operation of the faulty wireless communication device 1 adversely affects wireless communication of another wireless communication device.

Here, in the present embodiment, the frequency conversion unit 7 and the PA 8 of the transmission system correspond to an example of a transmission unit of the present invention; the LNA 4 and the frequency conversion unit 5 of the reception system correspond to an example of a reception unit of the present invention; the RFSW 9 corresponds to an example of a transmission/reception switchover unit of the present invention; the control unit 30 corresponds to an example of a communication control unit of the present invention; the modulation unit 16 corresponds to an example of a modulation unit of the present invention; and the demodulation unit 14 corresponds to an example of a demodulation unit of the present invention.

Furthermore, the control unit 30 that performs the processings of S120 to S150 in the fault diagnosis process corresponds to an example of a diagnosis start determination unit of the present invention; the control unit 30 that performs the processing of S160 and the path switchover circuit 22 correspond to an example of a loopback path forming unit of the present invention; the control unit 30 that performs the processings of S170 and S180 corresponds to an example of a reception level determination unit of the present invention; the control unit 30 that performs the processings of S200 and S210 corresponds to an example of a reception duration determination unit of the present invention; the control unit 30 that performs the processings of S230 and S240 corresponds to an example of a restored data determination unit of the present invention; and the control unit 30 that performs the processings of S180, S190, S210, S220, S240, S280 and S290, and the display unit 32 correspond to an example of a fault assertion unit of the present invention.

Although one embodiment of the present invention has been described hereinabove, the present invention is not limited to the embodiment and various embodiments are possible within a scope not departing from the spirit of the present invention.

Figure 3:
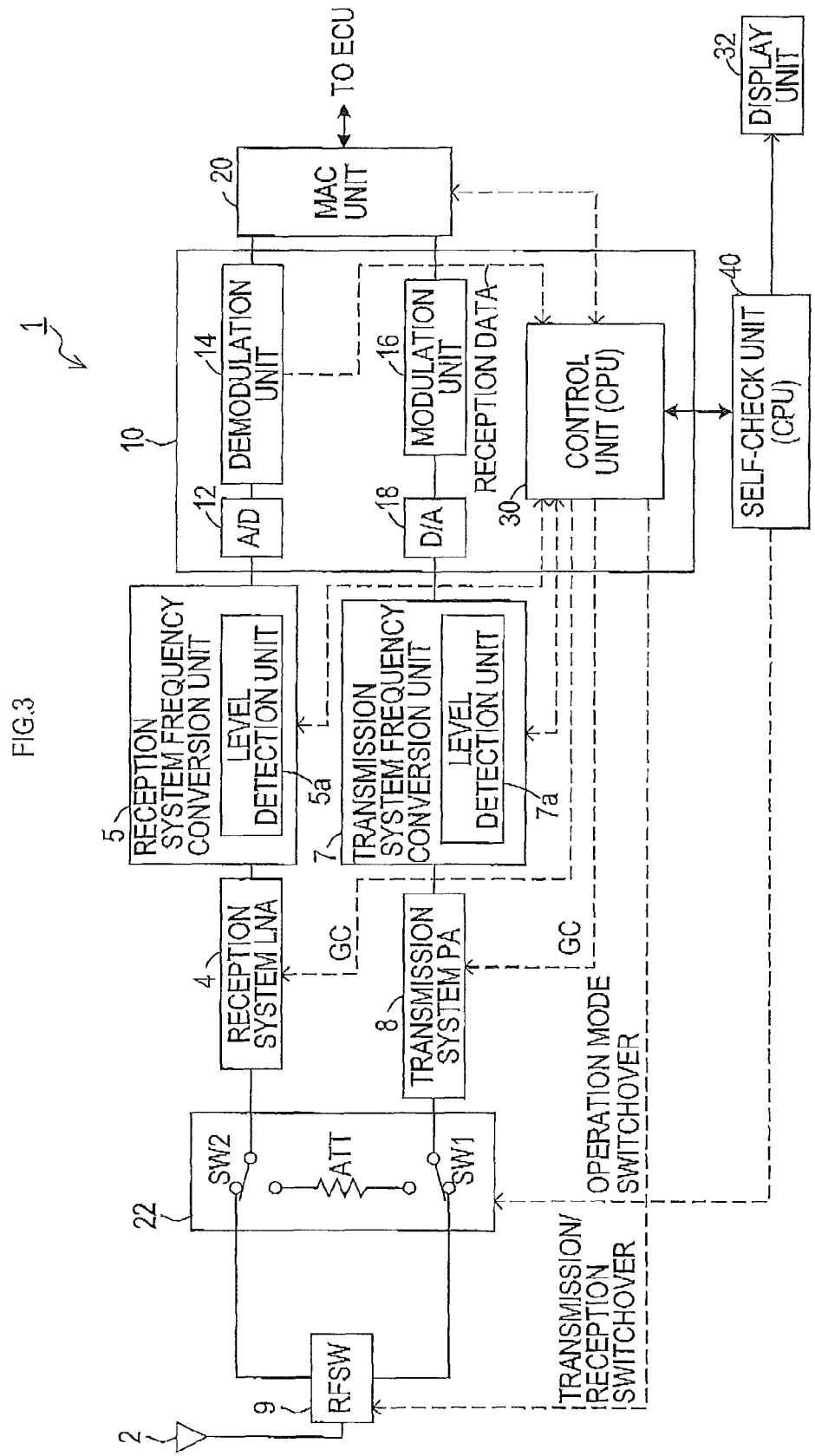
FIG. 3 is a block diagram showing a configuration of a wireless communication device of a modified example.

For example, although it has been described in the above embodiment that the fault diagnosis process shown in FIGS. 2A and 2B is performed by the control unit 30 for communication control provided in the base band processor 10, the fault diagnosis process may be performed by a self-check unit (microcomputer) 40, for example, provided separately from the control unit 20 in the base band processor 10, as shown in FIG. 3.

Moreover, although it has been described in the above embodiment that the wireless communication device 1 is installed in the mobile body 100 such as an automobile, the wireless communication device 1 may be installed in the fixed station 200, for example. In such a case, similar effects to those in the above embodiment can be obtained.

Furthermore, although it has been described in the above embodiment that, in the fault diagnosis process shown in FIGS. 2A and 2B, when an abnormality is determined to exist in S190, S220 or S250 and an error message corresponding to a content of the abnormality is displayed in S280, the process proceeds to S290 to interrupt the power supply of the wireless communication device 1, a configuration may be possible in S290 in which a power supply of the transmission system circuit (at least the PA 8) is interrupted and power supply to the reception system circuit is continued.

Such a configuration makes it possible not only to suppress that an abnormal radio wave, which interferes with wireless communication, is transmitted from the wireless communication device 1 to another wireless communication device, but also to receive a transmission signal from another wireless communication device and obtain information from the another wireless communication device if the reception system circuit is in a normal state.

What is claimed is:

1. A wireless communication device comprising:
an antenna for communication;
a transmission unit that outputs a transmission signal to the antenna;
a reception unit that signal-processes a reception signal from the antenna;
a transmission/reception switchover unit that selectively connects the antenna to either of the transmission unit and the reception unit;
a communication control unit that periodically connects the transmission unit to the antenna through the transmission/reception switchover unit to cause a periodic transmission to be performed by the transmission unit, and after the periodic transmission, connects the reception unit to the antenna through the transmission/reception switchover unit to control the reception unit to be in a reception standby state;
a diagnosis start determination unit that determines whether or not an unreception period, during which the reception unit does not receive a transmission signal from another wireless communication device, has reached a diagnosis start determination period set to be longer than a cycle of the periodic transmission;
a loopback path forming unit that forms a loopback path, which inputs the transmission signal outputted from the transmission unit into the reception unit, when the diagnosis start determination unit determines that the unreception period has reached the diagnosis start determination period;
a reception level determination unit that detects a signal level of a reception signal received by the reception unit when the loopback path is formed by the loopback path forming unit, and determines whether or not the signal level is normal;
a reception duration determination unit that measures a reception duration of the reception signal in the reception unit when the loopback path is formed by the loopback path forming unit, and determines whether or not the reception duration has exceeded a threshold value for abnormality determination; and
a fault assertion unit that determines that the wireless communication device is out of order in either of following cases; where the reception level determination unit determines that the signal level of the reception signal is not normal; and where the reception duration determination unit determines that the reception duration has exceeded the threshold value, and indicates such a fault in the wireless communication device.

2. The wireless communication device according to claim 1,
wherein the diagnosis start determination period is set to be equal to or longer than twice the cycle of the periodic transmission.

3. The wireless communication device according to claim 1, further comprising:
a modulation unit that converts a transmission data into a transmission signal for wireless transmission;
a demodulation unit that restores a reception data from the reception signal received by the reception unit; and
a restored data determination unit that determines whether or not the transmission data before conversion into the transmission signal by the modulation unit has been restored from the reception signal inputted into the reception unit through the loopback path by the demodulation unit when the loopback path is formed by the loopback path forming unit, wherein the fault assertion unit also determines that the wireless communication device is out of order when the restored data determination unit determines that the transmission data before conversion into the transmission signal by the modulation unit is not restored.

4. The wireless communication device according to claim 1, wherein the fault assertion unit is configured to prohibit wireless communication by the wireless communication device when the fault assertion unit determines that the wireless communication device is out of order.

5. The wireless communication device according to claim 4, wherein the fault assertion unit is configured to interrupt a power supply of the wireless communication device when the fault assertion unit determines that the wireless communication device is out of order.

6. The wireless communication device according to claim 5, wherein the fault assertion unit is configured to continue to indicate the fault in the wireless communication device even after the fault assertion unit has interrupted the power supply of the wireless communication device.

7. The wireless communication device according to claim 4, wherein the fault assertion unit is configured to interrupt at least a power supply of the transmission unit when the fault assertion unit determines that the wireless communication device is out of order.

8. The wireless communication device according to claim 7, wherein the fault assertion unit is configured to continue to indicate the fault in the wireless communication device even after the fault assertion unit has interrupted the at least the power supply of the transmission unit.

9. The wireless communication device according to claim 1, wherein the wireless communication device is installed in a mobile body.

10. The wireless communication device according to claim 1, wherein the wireless communication device is installed in a fixed station that performs wireless communication with a wireless communication device installed in a mobile body.

* * * * *